United States Patent
Menzes et al.

(10) Patent No.: US 7,050,964 B2
(45) Date of Patent: May 23, 2006

(54) SCALEABLE MACHINE TRANSLATION SYSTEM

(75) Inventors: Arul A. Menzes, Bellevue, WA (US); Stephen D. Richardson, Redmond, WA (US); Jessie E. Pinkham, Bellevue, WA (US); William B. Dolan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1019 days.

(21) Appl. No.: 09/899,755

(22) Filed: Jul. 5, 2001

(65) Prior Publication Data

US 2003/0023422 A1 Jan. 30, 2003

Related U.S. Application Data

(60) Provisional application No. 60/295,338, filed on Jun. 1, 2001.

(51) Int. Cl.
*G06F 17/28* (2006.01)
*G06F 17/21* (2006.01)

(52) U.S. Cl. ............................................ 704/2; 704/10

(58) Field of Classification Search .................... 704/1, 704/2, 3, 5, 8, 9, 10
See application file for complete search history.

(56) References Cited

U.S. PATENT DOCUMENTS

| | | | |
|---|---|---|---|
| 4,839,853 A | 6/1989 | Deerwester et al. ........... | 707/5 |
| 5,237,502 A * | 8/1993 | White et al. ................... | 704/1 |
| 5,278,980 A | 1/1994 | Pedersen et al. ............... | 707/4 |
| 5,325,298 A | 6/1994 | Gallant .......................... | 704/9 |
| 5,377,103 A | 12/1994 | Lamberti et al. ...... | 364/419.08 |
| 5,424,947 A | 6/1995 | Nagao et al. .................. | 704/9 |
| 5,592,661 A | 1/1997 | Eisenberg et al. .......... | 707/104 |
| 5,619,709 A | 4/1997 | Caid et al. .................... | 707/532 |
| 5,675,745 A | 10/1997 | Oku et al. ...................... | 705/7 |
| 5,675,819 A | 10/1997 | Schuetze ....................... | 704/9 |
| 5,724,594 A | 3/1998 | Pentheroudakis .............. | 704/9 |
| 5,794,050 A | 8/1998 | Dahlgren et al. ........... | 395/708 |
| 5,794,178 A | 8/1998 | Caid et al. ..................... | 704/9 |
| 5,799,308 A | 8/1998 | Dixon ......................... | 707/100 |
| 5,873,056 A | 2/1999 | Liddy et al. ................... | 704/9 |
| 5,884,247 A * | 3/1999 | Christy .......................... | 704/7 |
| 5,933,833 A | 8/1999 | Musashi ..................... | 707/102 |
| 6,006,221 A | 12/1999 | Liddy et al. ................... | 707/5 |
| 6,076,051 A | 6/2000 | Messerly et al. .............. | 704/9 |

(Continued)

FOREIGN PATENT DOCUMENTS

EP 0 304 191 A2 2/1989

(Continued)

OTHER PUBLICATIONS

Experiments in Automatic Phase Indexing for Document Retrieval: A Comparison of Syntactic and Nonsyntactic Methods, by Joel L. Fagan Degree Date: 1988.

Meyers, Adam et al., "Alignment of Shared Forests for Bilingual Corpora". p. 1-6 (1996).

(Continued)

*Primary Examiner*—Abul K. Azad
(74) *Attorney, Agent, or Firm*—Joseph R. Kelly; Westman, Champlin & Kelly, P.A.

(57) ABSTRACT

A computer implemented method translates a textual input in a first language to a textual output in a second language. An input logical form is generated based on the textual input. When a plurality of transfer mappings in a transfer mapping database match the input logical form (or at least a portion thereof) one or more of those plurality of matching transfer mappings is selected based on a predetermined metric. Textual output is generated based on the selected transfer logical form.

34 Claims, 8 Drawing Sheets

U.S. PATENT DOCUMENTS

| | | | |
|---|---|---|---|
| 6,098,033 A | 8/2000 | Richardson et al. | 704/1 |
| 6,871,174 B1 * | 3/2005 | Dolan et al. | 704/9 |

FOREIGN PATENT DOCUMENTS

| | | |
|---|---|---|
| EP | 0 304 191 A3 | 2/1989 |
| EP | 0 386 825 A1 | 9/1990 |
| EP | 0 687 987 A1 | 12/1995 |
| EP | 0 805 404 A1 | 4/1997 |
| EP | 02011351 | 8/2002 |
| EP | 02011980.6 | 11/2003 |

OTHER PUBLICATIONS

Somers, H. "Review Article: Example-based 25 Machine Translation", vol. 14, 1999, p. 113-157.

Collins, B. et al. "Adaption-guided Retrieval in EBMT: a case-based approach to machine translation". EWCBR-96 Switzerland pp. 14-16.

Oz, Z et al. "Ordering translation templates by assigning confidence factors". Machine Translation and the Information Soup. 1998 Berlin AMTA pp. 51-61.

Michael, Carl: "Inducing Translation Templates for Example-Based Machine Translation". Proceedings of MT-Summit VII. 1999. URL:http://www.iai.uni-sb.de/docs/edgar.pdf paragraph 03.2-last paragraph.

Habichler, Jurgen: "Experts (EDI/XML Procurement Enabling Real Trade Standards)" May 1999. pp. 1-13.

Elsbury, J.M., Personal Authentication Devices—Data Security Applications p. 471-478 1989.

James Allen, "Natural Language Understanding" The Benjamin/Cumming Publishing Company, Inc. Semantic Forms and Logic, Chapter 8. pp. 227-260, 1995.

Van Zuijlen, Job. M., "Probabilistic Methods in Dependency Grammar Parsing": International Parsing Workshop. 10375:142-141, 1989.

Salton, Gerard: "Automatic Information Organization and Retrieval", McGraw Hill Book Company, pp. 168-178, 1968.

Dagan et al., "Similarity-Based Estimation of Word Coocurrence Probabilities," in Proceedings of the 32nd Annual Meeting of the ACL, 1994, pp. 272-278.

Dagan et al., "Contextual Word Similarity and Esimation From Sparse Data," in Proceedings of the 31st Annual Meeting of the Assoc. for Computational Linguistics, Columbus, OH, Jun. 2-26, 1993, pp. 164-171.

Eesnik, Philip, "Disambiguating Noun Groups With Respect to WordNet Senses," in Proceedings of the Third Workshop on Very Large Corpora, MA, Jun. 31, 1995, pp. 1-16.

Salton, Gerard, and Michael J. McGill, Introduction to Modern Information Retrieval, McGraw-Hill Publishing Co., New York, NY 1983, entire book.

Sadler, Victor, Working With Analogical Semantics: Disambiguation Techniques in DLT, Foris Publications, Dordrecht, Holland, 1989, entire book.

Wilks et al., "Providing Machine Tractable Dictonary Tools," Machine Translations 5:99-154, 1990.

Hindle, Donald, "Noun Classification From Predicate-Argument Structures," in Proceedings of the 28th Annual Meetings of the ACL, Pittsburg, PA. Jun. 6-9, 1990, pp. 268-275.

Sato, Satoshi, "Example-Based Machine Translation," in Proceedings of the International Workshop on Fundamental Research for the Future Generation of Natural Language Processing, Kyoto, Japan, Sep. 1991, pp. 1-16.

Sumita, Eiichiro, and Hotioshi Iida, "Experiments and Prospects of Example-Based Machine Translation," in Proceedings of the 29th Annual Meetings of the ACL, 1991, pp. 185-192.

Hearst, Marti A., and Gregory Grefenstette, Refining Automatically-Discovered Lexical Relations: Combining Weak Techniques for Stronger Results,: in Papers From the 1992 AAAI Workshop, Menlo Park, CA 1992, pp. 64-72.

Furuse, Osamu, and Hitoshi Iida, "An Example-Based Method for Transfer-Driven Machine Translation,"in Proc. Of the 4th International Conference on Theoretical and Methodological Issues in Machine Translation, Montreal, Quebec, Canada, 1992, pp. 139-150.

Yarowsky, David, "Word-Sense Disambiguation Using Statistical Models of Roget's Categories Trained on Large Corpora," in Proceedings in the 15th Int'l. Conference on Computational Linguistics, Nantes, France, Aug. 23-28, 1992, pp. 454-460.

Brown et al., "Class-Based n-gram Models of Natural Language," Computational Linguistics 18(4):467-479, Dec. 1992.

Tsutsumi, Taijiro, Natural Language Processing: The PLNLP Approach, Kluwer Academic Publishers, Boston, MA, 1993, Chap. 20, "Word-Sense Disambiguation by Examples," pp. 263-272.

Pereira et al., "Distributional Clustering of English Words," in Proceedings of the 31st Annual Meeting of Assoc. for Computational Linguistics, Columbus, OH, Jun. 22-26, 1993, pp. 183-190.

Kozima, Hideki, and Teiji Furugori, "Similarity Between Words Computed by Spreading Activation on an English Dictionary," in Proceedings of the 6th Conference of the European Chapter of the ACL, Utrecht, Germany, 1993, pp. 232-240.

Braden-Harder, Lisa, Natural Language Processing: The PLNLP Approach, Kluwer Academic Publishers, Boston, MA, 1993, Chap. 19, "Sense Disambiguation Using Online Dictionaries," pp. 247-261.

Utsuro et al., "Thesaurus-Based Efficient Example Retrieval by Generating Retrieval Queries From Similarities," in Proceedings of the 15th International Conference on Computational Linguistics, Kyoto, Japan, Aug. 509, 1994, pp. 1044-1048.

Grishman, Ralph, and John Sterling, "Generalizing Automatically Generated Selectional patterns," in Proceedings of the 15th International Conference on Computational Linguistics, Kyoto, Japan, Aug. 5-9, 1994, pp. 742-747.

Uramoto, Naohiko, "A Best-Match Algorithm for Broad-Coverage Example-Based Disambiguation," in Proceedings of the 15th International Conference on Computational Linguistics, Kyoto, Japan, Aug. 5-9, 1994, pp. 717-721.

Agirre, Eneko, and German Rigau, "Word Sense Disambiguation Using Conceptual Density," in Proceedings of COLING 96, 1996, pp. 16-23.

Resnik, Philip, "Disambiguating Noun Groupings With Respect to WordNet Sense," in Proceedings of the 3rd Workshop on Very Large Corpora, Boston, MA., Jun. 30, 1995, pp. 1-16.

Somers, Harold "Review Article: Example-based Machine Translation" 2001 Kluwer Academic Pub. Printed in the Netherlands p. 113-157.

Zeynep Oz et al. Ordering Translation Templates by Assigning Confidence Factors XP-002209835.

Bro'na Collins et al. Adaption-Guided Retrieval in EBMT: A Case-Based Approach to Machine Translation—1996 XP002209833 p. 91-104.

* cited by examiner

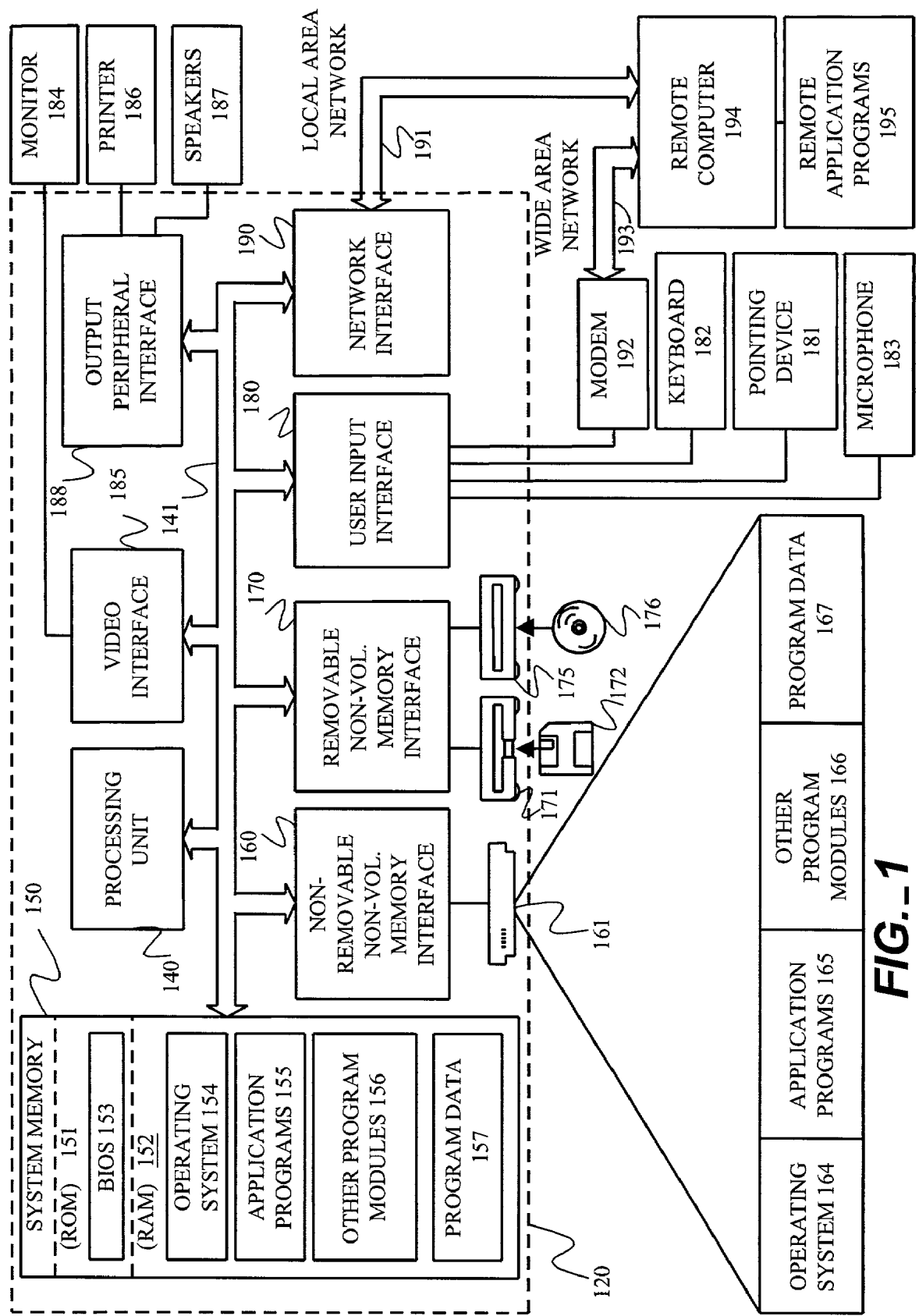
FIG._1

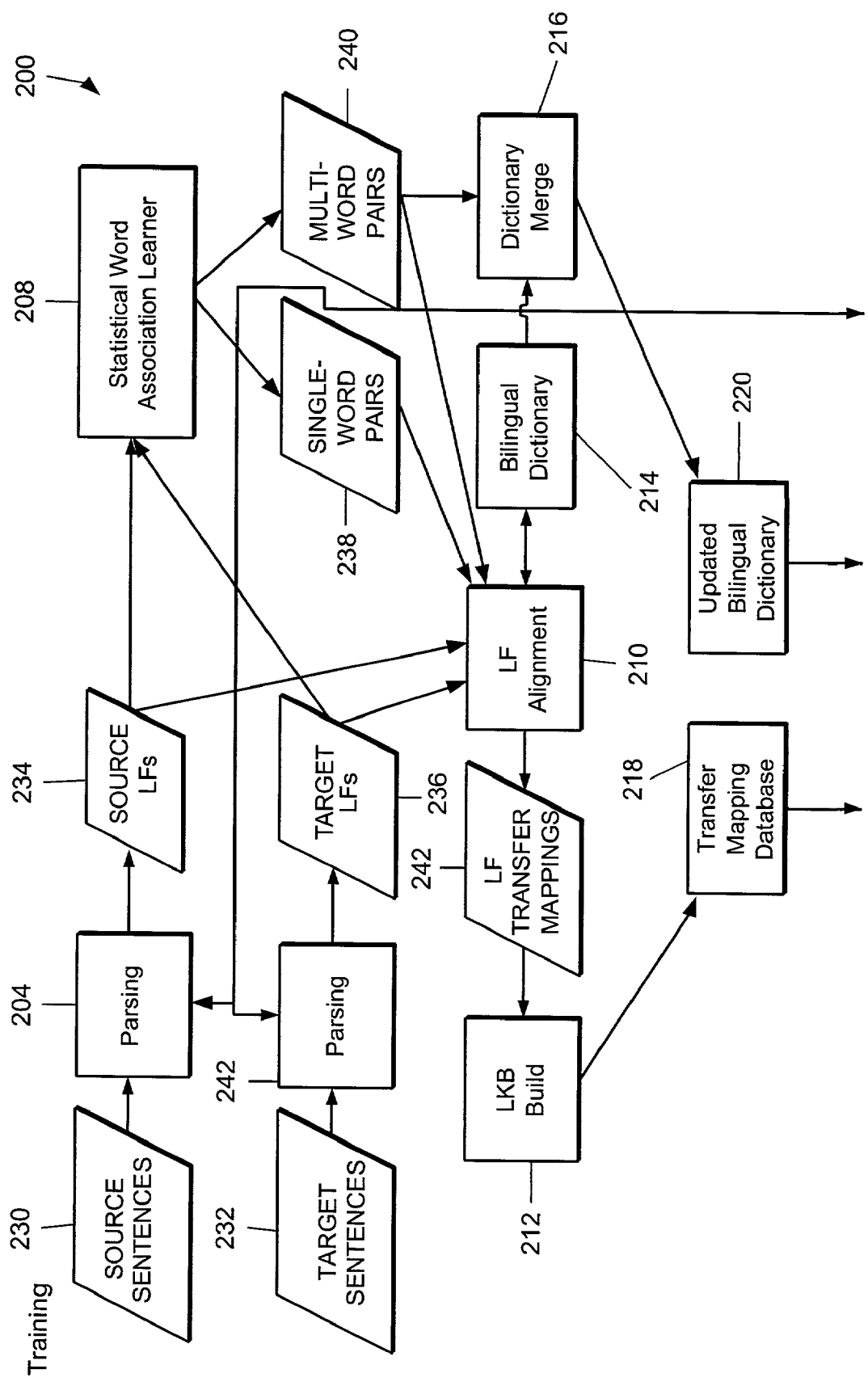
FIG._2A

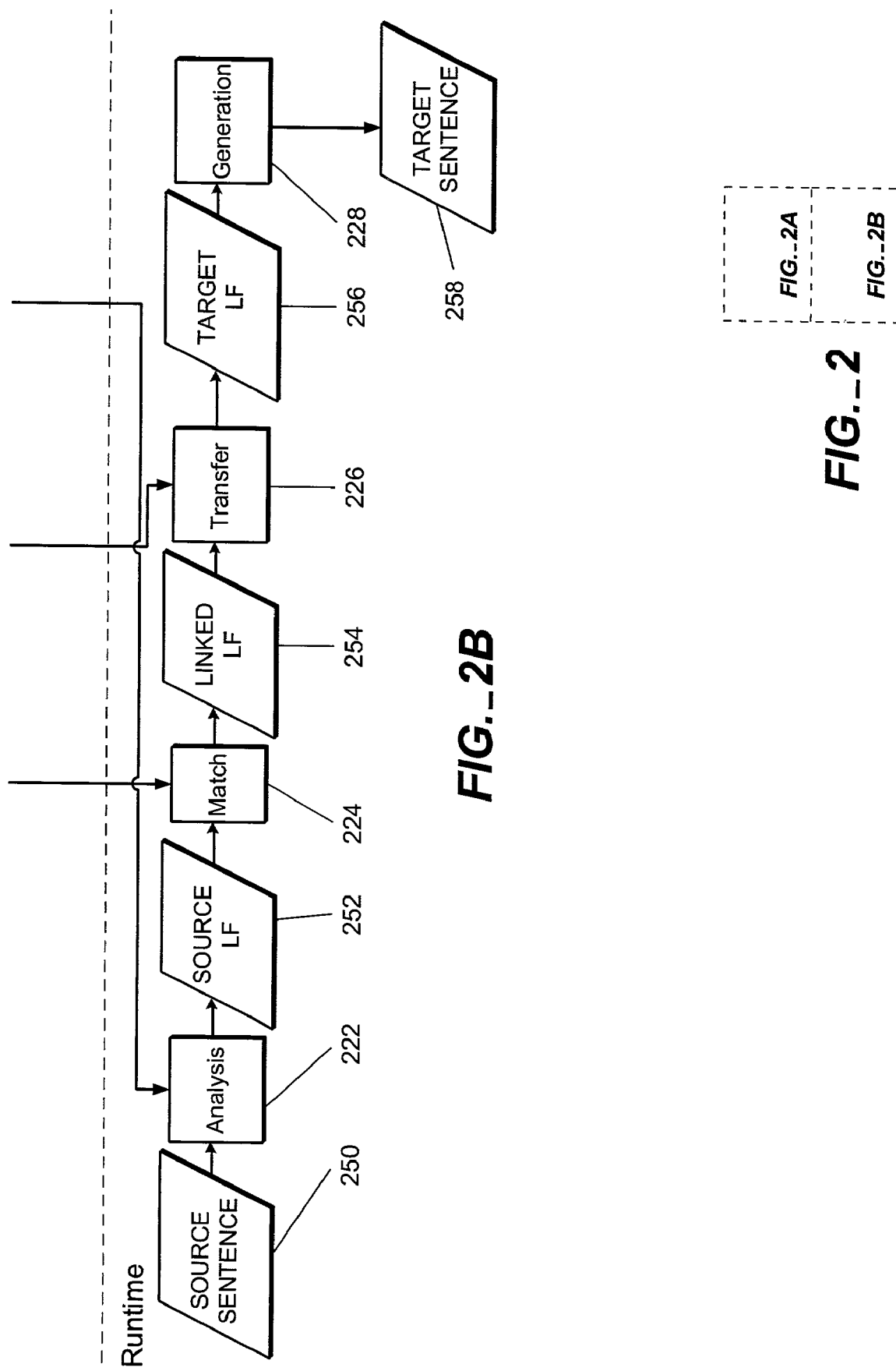

FIG._3A
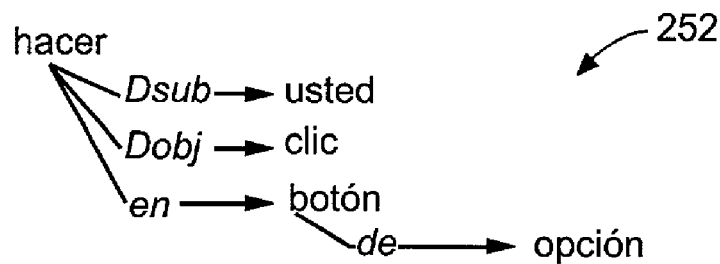
FIG._3B
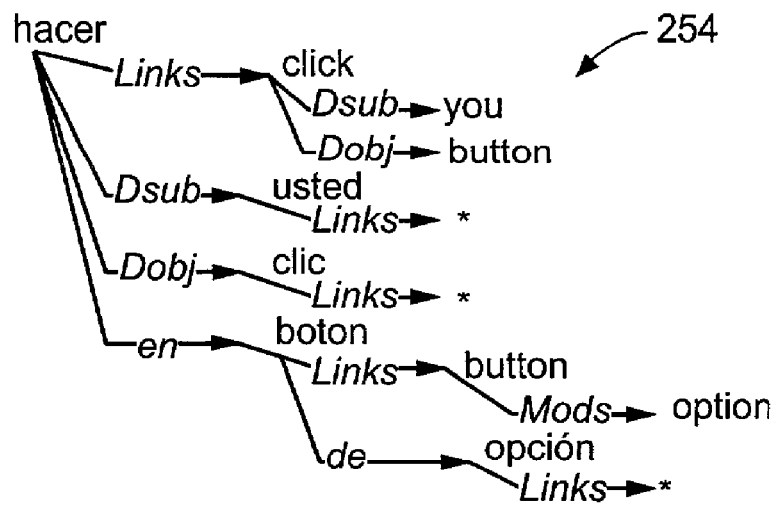
FIG._3C
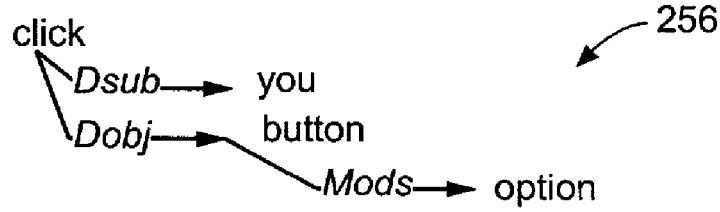

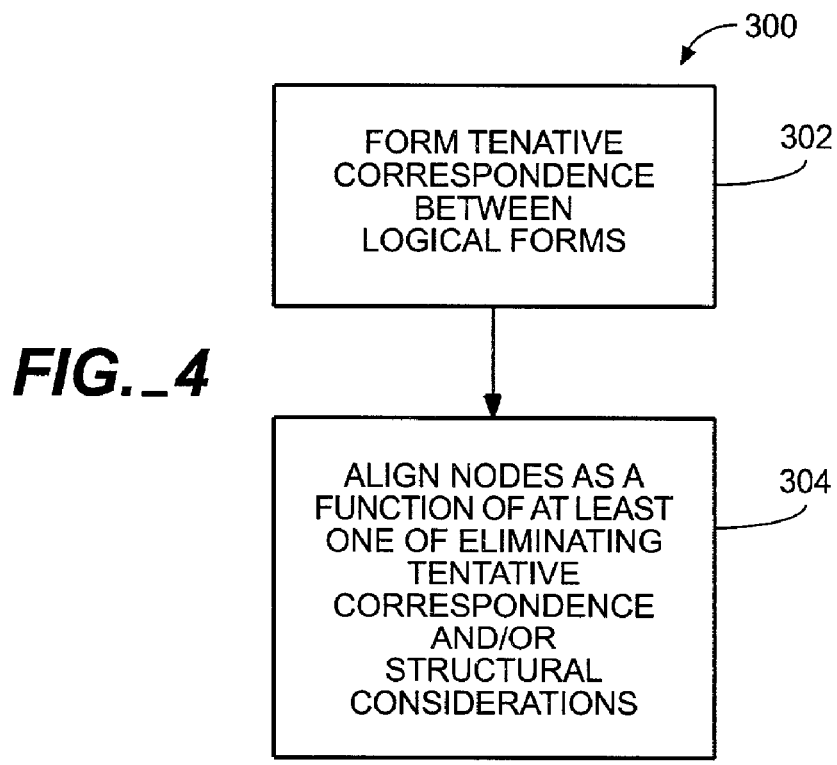
FIG._4
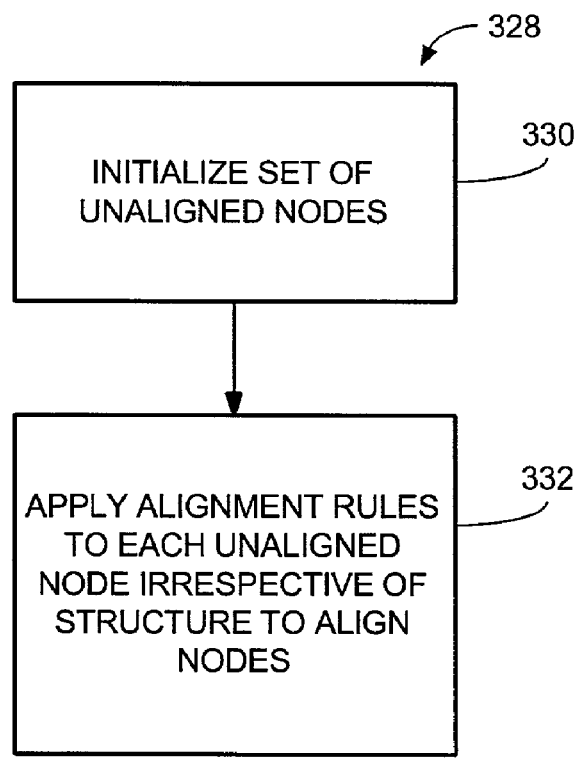
FIG._6

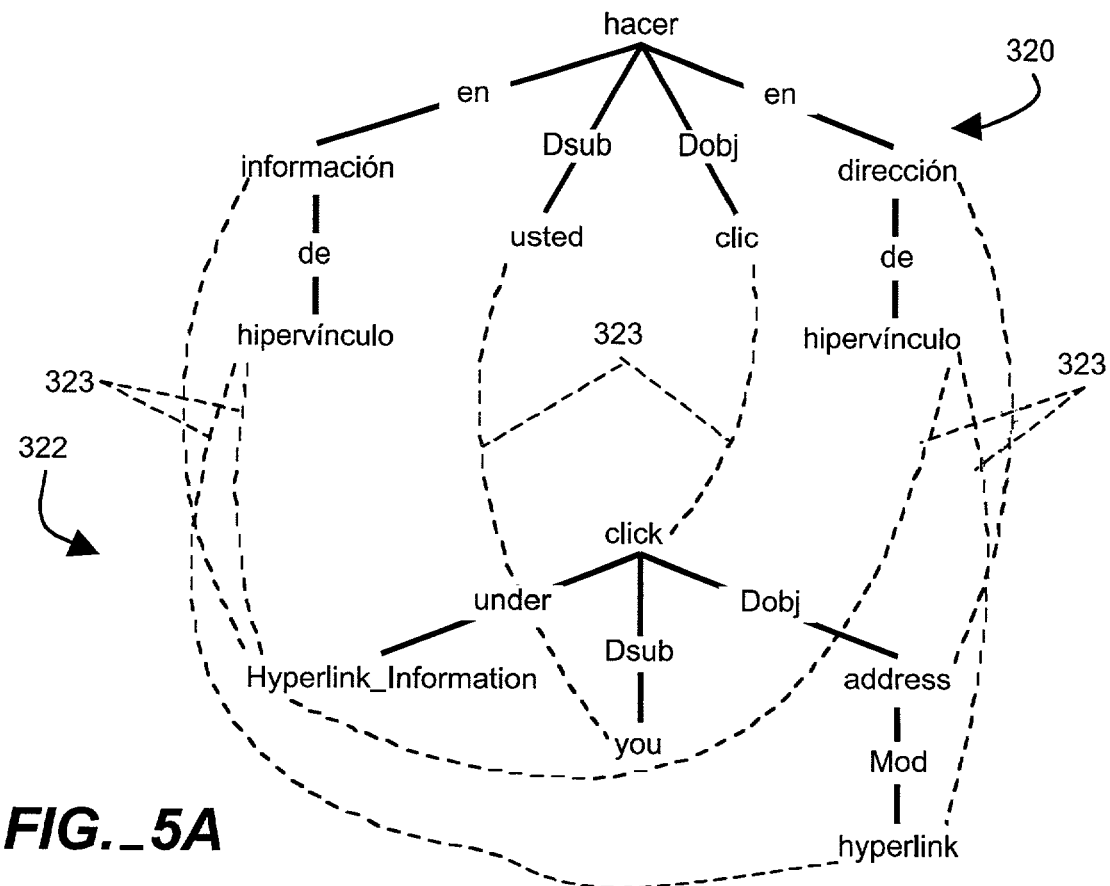
FIG._5A
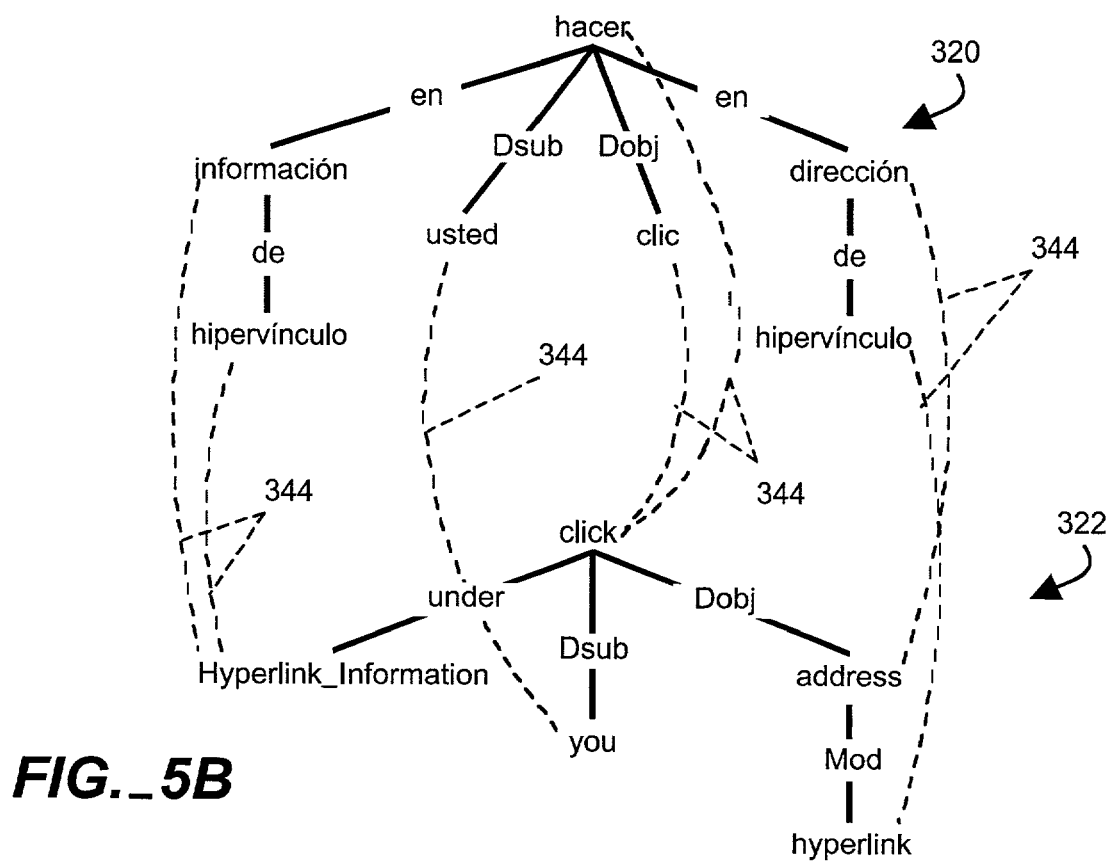
FIG._5B

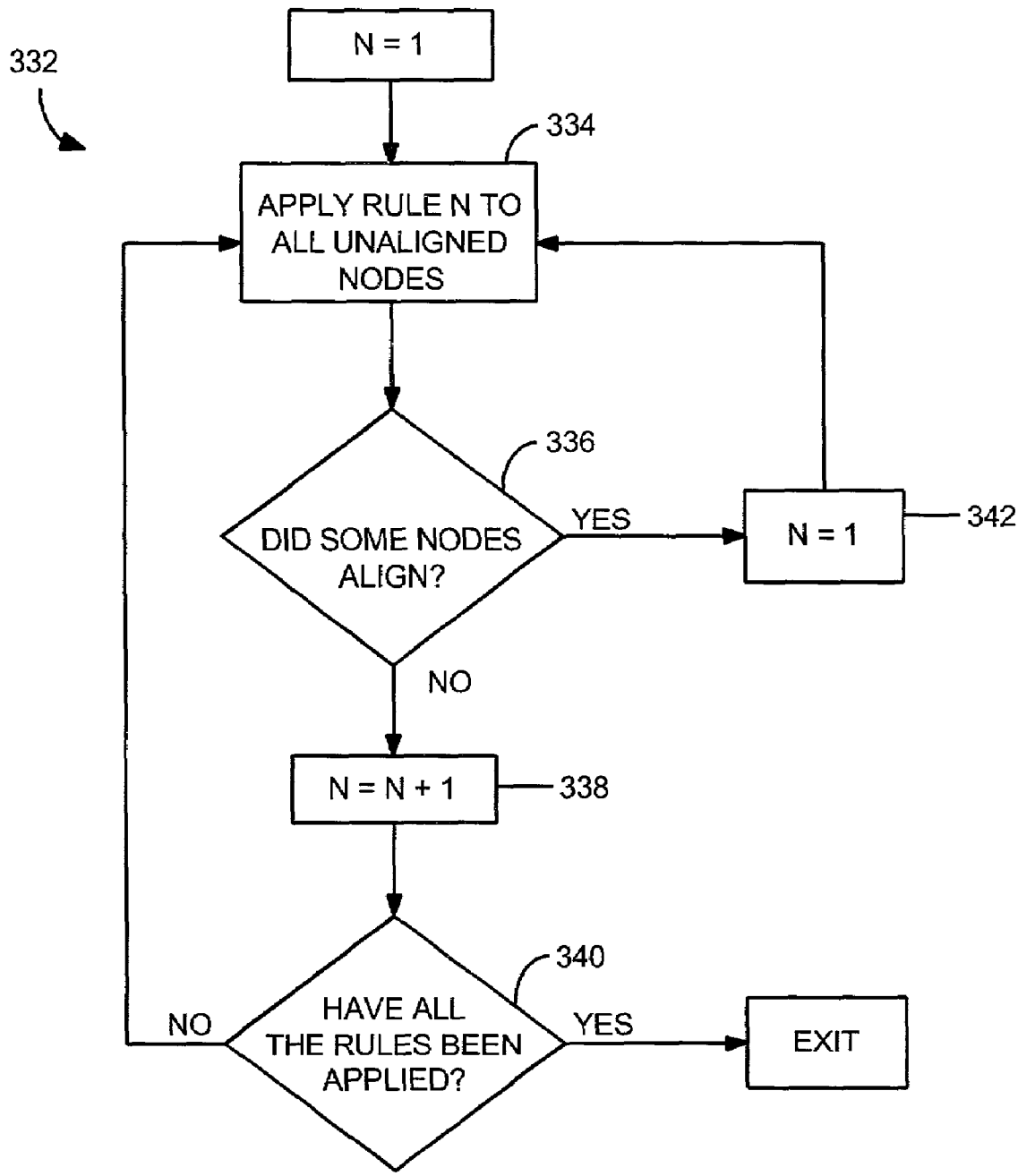
FIG._7

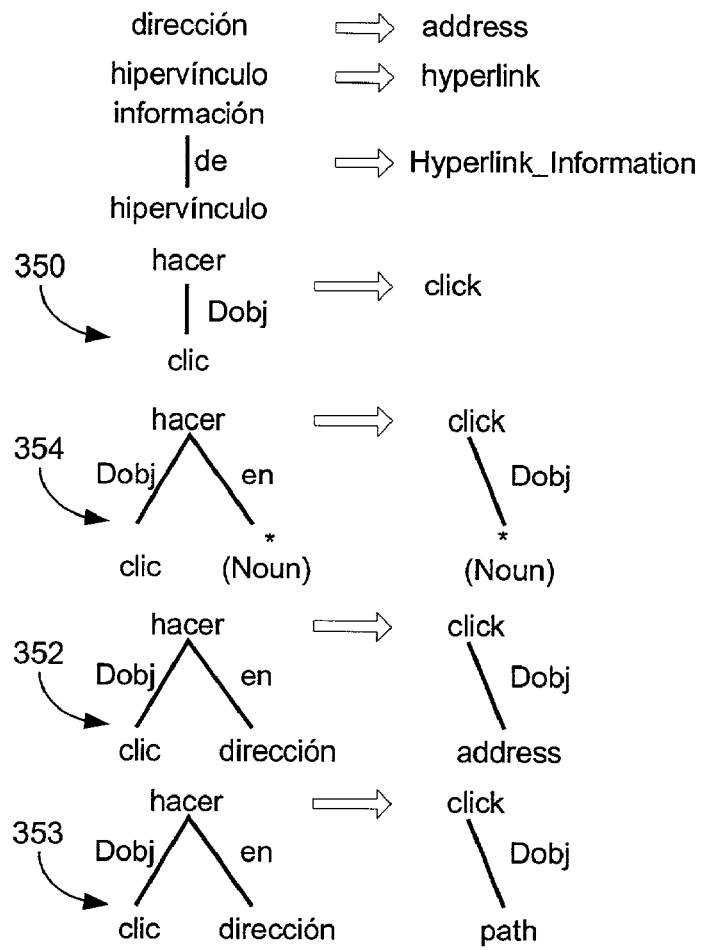
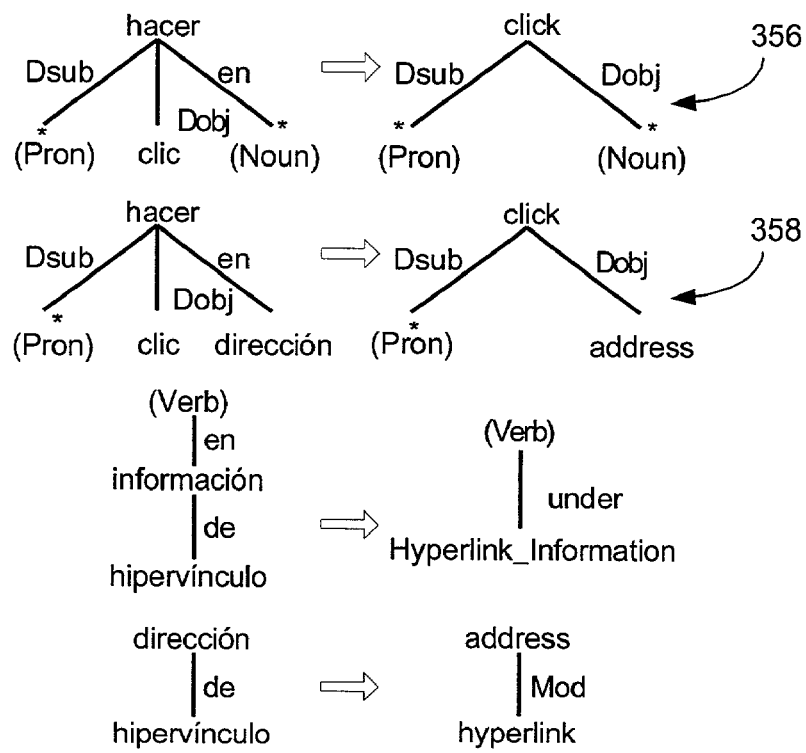
FIG._8

SCALEABLE MACHINE TRANSLATION SYSTEM

CROSS-REFERENCE TO RELATED APPLICATION

This application claims the benefit of U.S. provisional patent application Ser. No. 60/295,338, filed Jun. 1, 2001.

BACKGROUND OF THE INVENTION

The present invention relates to automated language translation systems. More specifically, the present invention relates to a scaleable machine translation system and architecture.

Machine translation systems are systems which receive a textual input in one language, translate it to a second language, and provide a textual output in the second language. Current commercially available machine translation systems rely on hand-coded transfer components that are both difficult and expensive to customize for a particular domain, and are also very difficult to scale to a desirable size. These disadvantages have limited their cost effectiveness and overall utility.

A variety of example based machine translation systems have been created to address these deficiencies. A number of such systems are described in H. Somers, *Review Article: Example—Based Machine Translation*, Machine Translation 14:113,157, 1999. Some of these typical example based machine translation research systems have been built with an example base built from up to approximately 200 sentences. They have encountered a great deal of difficulty in scaling to a larger example base and the performance of the system suffers from this difficulty.

Other of the data driven systems described in Somers parse the inputs from the example base using different parsers, based upon the particular language of the input text. The dependency structures resulting from such parsing are thus different, based upon the language and the particular parsing strategy used. Therefore, comparing the dependency structures from one language to the next is difficult, if not impossible.

Such prior systems have also not been easily scalable. For example, in order to increase the number of sentences over and above, for example, 200 sentences or so, has been very difficult. This is because the prior systems have difficulty handling noisy input data. Instead, the input data has been required to be in a precise form, or it has been cleaned up, and placed in the proper form, by hand. Of course, this makes it very difficult to dramatically increase the number of sentences because of the intensive labor required to clean up the data.

SUMMARY OF THE INVENTION

A computer implemented method translates a textual input in a first language to a textual output in a second language. An input logical form is generated based on the textual input. When a plurality of transfer mappings in a transfer mapping database match the input logical form (or at least a portion thereof) one or more of those plurality of matching transfer mappings is selected based on a predetermined metric. These transfer mappings are stitched together to form a transfer Logical Form. The textual output is generated based on the transfer logical form.

A transfer mapping is illustratively composed of a pair of logical form fragments, including a source and target logical form (LF), learned from the training data. At runtime the source side of these mappings is matched against the input. Among such matched mappings, a set is chosen. The target sides of these mappings is then stitched together to produce a single target LF. The output string is then generated from the target LF.

The predetermined metric can take one of a variety of forms, including the number of input nodes covered by the set of mappings collectively, size of the different transfer mappings that match the input logical form, the frequency with which the plurality of matching transfer mappings were generated during a training phase used in training the transfer mapping database, frequencies with which the plurality of matching transfer mappings are generated from completely aligned logical forms during training, frequencies with which the plurality of matching transfer mappings were generated from non-fitted parses of the training data, and a score associated with each of the plurality of matching transfer mappings that is indicative of a confidence in the transfer mapping with which it is associated.

The present invention can also be embodied as a machine translation system including a matching component configured to implement the method discussed above.

The present invention can also be implemented as a machine translation system that includes an input generator generating an input dependency structure based on the textual input. The system also includes a transfer mapping database that holds a plurality of transfer mapping dependency structures formed based on at least 10,000 parallel, aligned, training sentences. The transfer mapping database can also be formed based on 50,000, 100,000, 180,000, or even in excess of 200,000 training sentences.

In addition, the present invention can be embodied as a computer implemented method of training a transfer mapping database which includes generating shared input logical forms for bilingual input sentences, the input logical forms being shared across both languages.

In yet another embodiment, the present invention trains the transfer mapping database by filtering transfer mappings obtained from aligned logical forms, aligned during training.

BRIEF DESCRIPTION OF THE DRAWINGS

FIG. 1 is a block diagram of an illustrative environment in which the present invention may be used.

FIG. 2 is a block diagram of a machine translation architecture in accordance with one embodiment of the present invention.

FIG. 3A is an example of a logical form produced for a textual input in a source language (in this example, Spanish).

FIG. 3B is a linked logical form for the textual input in the source language.

FIG. 3C is a target logical form representing a translation of the source language input to a target language output (in this example, English).

FIG. 4 is a flow diagram illustrating a method for aligning nodes.

FIG. 5A is an example of tentative correspondences formed between logical forms.

FIG. 5B is an example of aligned nodes formed between the logical forms of FIG. 5A.

FIG. 6 is a flow diagram illustrating application of a set of rules to the method of FIG. 4.

FIG. 7 is a flow diagram illustrating application of an ordered set of rules.

FIG. 8 is a set of transferred mappings associated with the example of FIG. 5B.

DETAILED DESCRIPTION OF ILLUSTRATIVE EMBODIMENTS GENERAL OVERVIEW

The following is a brief description of a general purpose computer 120 illustrated in FIG. 1. However, the computer 120 is only one example of a suitable computing environment and is not intended to suggest any limitation as to the scope of use or functionality of the invention. Neither should the computer 120 be interpreted as having any dependency or requirement relating to any one or combination of modules illustrated therein.

The invention may be described in the general context of computer-executable instructions, such as program modules, being executed by a computer. Generally, program modules include routines, programs, objects, modules, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, modules of computer 120 may include, but are not limited to, a processing unit 140, a system memory 150, and a system bus 141 that couples various system modules or components including the system memory to the processing unit 140. The system bus 141 may be any of several types of bus structures including a memory bus or memory controller, a peripheral bus, and a local bus using any of a variety of bus architectures. By way of example, and not limitation, such architectures include Industry Standard Architecture (ISA) bus, Universal Serial Bus (USB), Micro Channel Architecture (MCA) bus, Enhanced ISA (EISA) bus, Video Electronics Standards Association (VESA) local bus, and Peripheral Module Interconnect (PCI) bus also known as Mezzanine bus. Computer 120 typically includes a variety of computer readable mediums. Computer readable mediums can be any available media that can be accessed by computer 120 and includes both volatile and nonvolatile media, removable and non-removable media. By way of example, and not limitation, computer readable mediums may comprise computer storage media and communication media. Computer storage media includes both volatile and nonvolatile, removable and non-removable media implemented in any method or technology for storage of information such as computer readable instructions, data structures, program modules/components or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 120.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 150 includes computer storage media in the form of volatile and/or nonvolatile memory such as read only memory (ROM) 151 and random access memory (RAM) 152. A basic input/output system 153 (BIOS), containing the basic routines that help to transfer information between elements within computer 120, such as during start-up, is typically stored in ROM 151. RAM 152 typically contains data and/or program modules that are immediately accessible to and/or presently being operated on by processing unit 140. By way of example, and not limitation, FIG. 1 illustrates operating system 154, application programs 155, other program modules 156, and program data 157.

The computer 120 may also include other removable/non-removable volatile/nonvolatile computer storage media. By way of example only, FIG. 1 illustrates a hard disk drive 161 that reads from or writes to non-removable, nonvolatile magnetic media, a magnetic disk drive 171 that reads from or writes to a removable, nonvolatile magnetic disk 172, and an optical disk drive 175 that reads from or writes to a removable, nonvolatile optical disk 176 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 161 is typically connected to the system bus 141 through a non-removable memory interface such as interface 160, and magnetic disk drive 171 and optical disk drive 175 are typically connected to the system bus 141 by a removable memory interface, such as interface 170.

The drives and their associated computer storage media discussed above and illustrated in FIG. 1, provide storage of computer readable instructions, data structures, program modules and other data for the computer 120. In FIG. 1, for example, hard disk drive 161 is illustrated as storing operating system 164, application programs 165, other program modules 166, and program data 167. Note that these modules can either be the same as or different from operating system 154, application programs 155, other program modules 156, and program data 157. Operating system 164, application programs 165, other program modules 166, and program data 167 are given different numbers here to illustrate that, at a minimum, they are different copies.

A user may enter commands and information into the computer 120 through input devices such as a keyboard 182, a microphone 183, and a pointing device 181, such as a mouse, trackball or touch pad. Other input devices (not shown) may include a joystick, game pad, satellite dish, scanner, or the like. These and other input devices are often connected to the processing unit 140 through a user input interface 180 that is coupled to the system bus, but may be connected by other interface and bus structures, such as a parallel port, game port or a universal serial bus (USB). A monitor 184 or other type of display device is also connected to the system bus 141 via an interface, such as a video interface 185. In addition to the monitor, computers may also include other peripheral output devices such as speakers 187 and printer 186, which may be connected through an output peripheral interface 188.

The computer 120 may operate in a networked environment using logical connections to one or more remote computers, such as a remote computer 194. The remote computer 194 may be a personal computer, a hand-held device, a server, a router, a network PC, a peer device or other common network node, and typically includes many or all of the elements described above relative to the computer 120. The logical connections depicted in FIG. 1 include a local area network (LAN) 191 and a wide area network (WAN) 193, but may also include other networks. Such networking environments are commonplace in offices, enterprise-wide computer networks, intranets and the Internet.

When used in a LAN networking environment, the computer 120 is connected to the LAN 191 through a network interface or adapter 190. When used in a WAN networking environment, the computer 120 typically includes a modem 192 or other means for establishing communications over the WAN 193, such as the Internet. The modem 192, which may be internal or external, may be connected to the system bus 141 via the user input interface 180, or other appropriate mechanism. In a networked environment, program modules depicted relative to the computer 120, or portions thereof, may be stored in the remote memory storage device. By way of example, and not limitation, FIG. 1 illustrates remote application programs 195 as residing on remote computer 194. It will be appreciated that the network connections shown are exemplary and other means of establishing a communications link between the computers may be used.

The invention is also operational with numerous other general purpose or special purpose computing systems, environments or configurations. Examples of well known computing systems, environments, and/or configurations that may be suitable for use with the invention include, but are not limited to, regular telephones (without any screen) personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Overview of Machine Translation System

Prior to discussing the present invention in greater detail, a brief discussion of a logical form may be helpful. A full and detailed discussion of logical forms and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, logical forms are generated by performing a morphological analysis on an input text to produce conventional phrase structure analyses augmented with grammatical relations. Syntactic analyses undergo further processing in order to derive logical forms, which are data structures that describe labeled dependencies among content words in the textual input. Logical forms can normalize certain syntactical alternations, (e.g., active/passive) and resolve both intrasentential anaphora and long distance dependencies. As illustrated herein, for example in FIG. 3A, a logical form 252 can be represented as a graph, which helps intuitively in understanding the elements of logical forms. However, as appreciated by those skilled in the art, when stored on a computer readable medium, the logical forms may not readily be understood as representing a graph.

Specifically, a logical relation consists of two words joined by a directional relation type, such as: LogicalSubject, LogicalObject,
IndirectObject;
LogicalNominative, LogicalComplement, LogicalAgent;
CoAgent, Beneficiary;
Modifier, Attribute, SentenceModifier;
PrepositionalRelationship;
Synonym, Equivalence, Apposition;
Hypernym, Classifier, SubClass;
Means, Purpose;
Operator, Modal, Aspect, DegreeModifier, Intensifier;
Focus, Topic;
Duration, Time;
Location, Property, Material, Manner, Measure, Color, Size;
Characteristic, Part;
Coordinate;
User, Possessor;
Source, Goal, Cause, Result; and
Domain.

A logical form is a data structure of connected logical relations representing a single textual input, such as a sentence or part thereof. The logical form minimally consists of one logical relation and portrays structural relationships (i.e., syntactic and semantic relationships), particularly argument and/or adjunct relation(s) between important words in an input string.

In one illustrative embodiment, the particular code that builds logical forms from syntactic analyses is shared across the various source and target languages that the machine translation system operates on. The shared architecture greatly simplifies the task of aligning logical form segments from different languages since superficially distinct constructions in two languages frequently collapse onto similar or identical logical form representations. Examples of logical forms in different languages are described in greater detail below with respect to FIGS. 3A–3C.

FIG. 2 is a block diagram of an architecture of a machine translation system 200 in accordance with one embodiment of the present invention. System 200 includes parsing components 204 and 206, statistical word association learning component 208, logical form alignment component 210, lexical knowledge base building component 212, bilingual dictionary 214, dictionary merging component 216, transfer mapping database 218 and updated bilingual dictionary 220. During training and translation run time, the system 200 utilizes analysis component 222, matching component 224, transfer component 226 and/or generation component 228.

In one illustrative embodiment, a bilingual corpus is used to train the system. The bilingual corpus includes aligned translated sentences (e.g., sentences in a source or target language, such as English, in 1-to-1 correspondence with their human-created translations in the other of the source or target language, such as Spanish). During training, sentences are provided from the aligned bilingual corpus into system 200 as source sentences 230 (the sentences to be translated), and as target sentences 232 (the translation of the source sentences). Parsing components 204 and 206 parse the sentences from the aligned bilingual corpus to produce source logical forms 234 and target logical forms 236.

During parsing, the words in the sentences are converted to normalized word forms (lemmas) and can be provided to statistical word association learning component 208. Both single word and multi-word associations are iteratively hypothesized and scored by learning component 208 until a reliable set of each is obtained. Statistical word association learning component 208 outputs learned single word translation pairs 238 as well as multi-word pairs 240.

The multi-word pairs 240 are provided to a dictionary merge component 216, which is used to add additional entries into bilingual dictionary 214 to form updated bilingual dictionary 220. The new entries are representative of the multi-word pairs 240.

The single and multi-word pairs 238, along with source logical forms 234 and target logical forms 236 are provided to logical form alignment component 210. Briefly, component 210 first establishes tentative correspondences between nodes in the source and target logical forms 230 and 236, respectively. This is done using translation pairs from a bilingual lexicon (e.g. bilingual dictionary) 214, which can be augmented with the single and multi-word translation pairs 238, 240 from statistical word association learning component 208. After establishing possible correspondences, alignment component 210 aligns logical form nodes according to both lexical and structural considerations and creates word and/or logical form transfer mappings 242. This aspect will be explained in greater detail below.

Basically, alignment component 210 draws links between logical forms using the bilingual dictionary information 214 and single and multi-word pairs 238, 240. The transfer mappings are optionally filtered based on a frequency with which they are found in the source and target logical forms 234 and 236 and are provided to a lexical knowledge base building component 212.

While filtering is optional, in one example, if the transfer mapping is not seen at least twice in the training data, it is not used to build transfer mapping database 218, although any other desired frequency can be used as a filter as well. It should also be noted that other filtering techniques can be used as well, other than frequency of appearance. For example, transfer mappings can be filtered based upon whether they are formed from complete parses of the input sentences and based upon whether the logical forms used to create the transfer mappings are completely aligned.

Component 212 builds transfer mapping database 218, which contains transfer mappings that basically link words and/or logical forms in one language, to words and/or logical forms in the second language. With transfer mapping database 218 thus created, system 200 is now configured for runtime translations.

During translation run time, a source sentence 250, to be translated, is provided to analysis component 222. Analysis component 222 receives source sentence 250 and creates a source logical form 252 based upon the source sentence input. An example may be helpful. In the present example, source sentence 250 is a Spanish sentence "Haga click en el boton de opcion" which is translated into English as "Click the option button" or, literally, "Make click in the button of option".

FIG. 3A illustrates the source logical form 252 generated for source sentence 250 by analysis component 222. The source logical form 252 is provided to matching component 224. Matching component 224 attempts to match the source logical form 252 to logical forms in the transfer mapping database 218 in order to obtain a linked logical form 254. Multiple transfer mappings may match portions of source logical form 252. Matching component 224 searches for the best set of matching transfer mappings in database 218 that have matching lemmas, parts of speech, and other feature information. The set of best matches is found based on a predetermined metric. For example, transfer mappings having larger (more specific) logical forms may illustratively be preferred to transfer mappings having smaller (more general) logical forms. Among mappings having logical forms of equal size, matching component 224 may illustratively prefer higher frequency mappings. Mappings may also match overlapping portions of the source logical form 252 provided that they do not conflict with each other in any way. A set of mappings collectively may be illustratively preferred if they cover more of the input sentence than alternative sets. Other metrics used in matching the input logical form to those found in database 218 are discussed in greater detail below with respect to Table 1.

After a set of matching transfer mappings is found, matching component 224 creates links on nodes in the source logical form 252 to copies of the corresponding target words or logical form segments received by the transfer mappings, to generate linked logical form 254. FIG. 3B illustrates an example of linked logical form 254 for the present example. Links for multi-word mappings are represented by linking the root nodes (e.g., Hacer and Click) of the corresponding segments, then linking an asterisk to the other source nodes participating in the multi-word mapping (e.g., Usted and Clic). Sublinks between corresponding individual source and target nodes of such a mapping (not shown in FIG. 3B) may also illustratively be created for use during transfer.

Transfer component 226 receives linked logical form 254 from matching component 224 and creates a target logical form 256 that will form the basis of the target translation. This is done by performing a top down traversal of the linked logical form 254 in which the target logical form segments pointed to by links on the source logical form 252 nodes are combined. When combining together logical form segments for possibly complex multi-word mappings, the sublinks set by matching component 224 between individual nodes are used to determine correct attachment points for modifiers, etc. Default attachment points are used if needed.

In cases where no applicable transfer mappings are found, the nodes in source logical form 252 and their relations are simply copied into the target logical form 256. Default single word translations may still be found in transfer mapping database 218 for these nodes and inserted in target logical form 256. However, if none are found, translations can illustratively be obtained from updated bilingual dictionary 220, which was used during alignment.

FIG. 3C illustrates a target logical form 256 for the present example. It can be seen that the logical form segments from "click" to "button" and from "button" to "option" were stitched together from linked logical form 254 to obtain target logical form 256.

Generation component 228 is illustratively a rule-based, application-independent generation component that maps from target logical form 256 to the target string (or output target sentence) 258. Generation component 228 may illustratively have no information regarding the source language of the input logical forms, and works exclusively with information passed to it by transfer component 226. Generation component 228 also illustratively uses this information in conjunction with a monolingual (e.g., for the target language) dictionary to produce target sentence 258. One generic generation component 228 is thus sufficient for each language.

It can thus be seen that the present system parses information from various languages into a shared, common, logical form so that logical forms can be matched among different languages. The system can also utilize simple filtering techniques in building the transfer mapping database to handle noisy data input. Therefore, the present system can be automatically trained using a very large number of sentence pairs. In one illustrative embodiment, the number of sentence pairs is in excess of 10,000. In another illustrative embodiment, the number of sentence pairs is greater than 50,000 to 100,000, and may be in excess of 180,000, 200,000, 350,000 or even in excess if 500,000 or 600,000 sentence pairs. Also, the number of sentence pairs can vary for different languages, and need not be limited to these numbers.

Logical Form Alignment

FIG. 4 illustrates a method 300 of associating logical forms of at least sentence fragments from two different languages, wherein the logical forms comprise nodes organized in a parent/child structure. Method 300 includes associating nodes of the logical forms to form tentative correspondences as indicated at block 302 and aligning nodes of the logical forms by eliminating at least one of the tentative correspondences and/or structural considerations as indicated at block 304.

As indicated above with respect to FIG. 2, alignment component 210 accesses bilingual dictionary 214 in order to form tentative correspondences, typically lexical correspondences, between the logical forms. Bilingual dictionary 214 can be created by merging data from multiple sources, and can also use inverted target-to-source dictionary entries to improve coverage. As used herein, bilingual dictionary 214 also represents any other type of resource that can provide correspondences between words. Bilingual dictionary 214 can also be augmented with translation correspondences acquired using statistical techniques.

In FIG. 2, the statistical techniques are performed by component 208. Although the output from component 208 can be used by alignment component 210, it is not necessary for operation of alignment component 210. However, one embodiment of component 208 will be described here, briefly, for the sake of completeness.

Component 208 receives a parallel, bilingual training corpus that is parsed into its content words. Word association scores for each pair of content words consisting of a word of language L1 that occurs in a sentence aligned in the bilingual corpus to a sentence of language L2 in which the other word occurs. A pair of words is considered "linked" in a pair of aligned sentences if one of the words is the most highly associated, of all the words in its sentence, with the other word. The occurrence of compounds is hypothesized in the training data by identifying maximal, connected sets of linked words in each pair of aligned sentences in the processed and scored training data. Whenever one of these maximal, connected sets contains more than one word in either or both of the languages, the subset of the words in that language is hypothesized as a compound. The original input text is rewritten, replacing the hypothesized compounds by single, fused tokens. The association scores are then recomputed for the compounds (which have been replaced by fused tokens) and any remaining individual words in the input text. The association scores are again recomputed, except that this time, co-occurrences are taken into account in computing the association scores only where there is no equally strong or stronger other association in a particular pair of aligned sentences in the training corpus.

Translation pairs can be identified as those word pairs or token pairs that have association scores above a threshold, after the final computation of association scores.

Similarly, component 208 can also assist in identifying translations of "captoids", by which we mean titles, or other special phrases, all of whose words are capitalized. (Finding translations of captoids presents a special problem in languages like French or Spanish, in which convention dictates that only the first word of such an item is capitalized, so that the extent of the captoid translation is difficult to determine.) In that embodiment, compounds are first identified in a source language (such as English). This can be done by finding strings of text where the first word begins with a capital letter, and later tokens in the contiguous string do not begin with a lowercase letter. Next, compounds are hypothesized in the target text by finding words that start with a capital letter and flagging this as the possible start of a corresponding compound. The target text is then scanned from left to right flagging subsequent words that are most strongly related to words in the identified compound in the source text, while allowing up to a predetermined number (e.g., 2) contiguous non-most highly related words, so long as they are followed by a most highly related word.

The left to right scan can be continued until more than the predetermined number (e.g., more than 2) contiguous words are found that are not most highly related to words in the identified compound in the source text, or until no more most highly related words are present in the target text, or until punctuation is reached.

While the above description has been provided for component 208, it is to be noted that component 208 is optional.

Referring again to method 300 in FIG. 4, generally, forming tentative correspondences in step 302 is aggressively pursued with the purpose of attempting to maximize the number of tentative correspondences formed between the logical forms. Accuracy of the tentative correspondences is not the most important criteria in step 302 because step 304 will further analyze the tentative correspondences and remove those that are determined to be incorrect.

Bilingual dictionary 214 represents direct translations used for forming tentative correspondences. However, in order to form additional tentative correspondences, derivational morphology can also be used. For example, translations of morphological bases and derivations, and base and derived forms of translations, can also be used to form tentative correspondences in step 302. Likewise, tentative correspondences can also be formed between nodes of the logical forms wherein one of the nodes comprises more lexical elements or words than the other node. For instance, as is common, one of the nodes can comprise a single word in one of the languages, while the other node comprises at least two words in the other language. Closely related languages such as English, Spanish, etc. also have word similarity (cognates) that can be used with fuzzy logic to ascertain associations. These associations can then be used to form tentative correspondences.

At this point, it may be helpful to consider an example of logical forms to be aligned. Referring to FIG. 5A, logical form 320 was generated for the sentence "En Información del hipervinculo, haga clic en la dirección del hipervinculo", while logical form 322 was generated for the English translation as "Under Hyperlink Information, click the Hyperlink address."

FIG. 5A further illustrates each of the tentative correspondences 323 identified in step 302. As an example of the aggressive pursuit of tentative correspondences in step 302, in this example, each of the occurrences of "Hipervinculo" includes two different tentative correspondences with "Hyperlink_Information" and "hyperlink" in the English logical form 322.

Referring now to step 304, the logical forms are aligned, which can include eliminating one or more of the tentative correspondences formed in step 302, and/or which can be done as a function of structural considerations of the logical forms. In one embodiment, step 304 includes aligning nodes of the logical forms as a function of a set of rules. In a further embodiment, each of the rules of the set of rules is applied to the logical forms in a selected order. In particular, the rules are ordered to create the most unambiguous alignments ("best alignments") first, and then, if necessary, to disambiguate subsequent node alignments. It is important to note that the order that the rules are applied in is not based upon the structure of the logical forms, i.e., top-down processing or bottom-up processing but rather, to begin with the most linguistically meaningful alignments, wherever they appear in the logical form. As such, this set of rules can be considered to be applied to the nodes of each of the logical forms non-linearly as opposed to linearly based upon the structure of the logical forms. Generally, the rules are intended to be language-neutral in order that they can be universally applied to any language.

FIG. 6 generally illustrates application of the set of rules to the logical forms as method 328. At step 330, each of the nodes of the logical forms is considered to be "unaligned" as opposed to "aligned". The set of rules is applied to the unaligned nodes irrespective of structure at step 332 to form aligned nodes. Therefore, it is desirable to distinguish between unaligned nodes and aligned nodes. One technique includes assigning all of the nodes initially to the set of unaligned nodes, and removing nodes when they are aligned. The use of sets whether actively formed in different locations of a computer readable medium or virtually formed through the use of Boolean tags associated with the nodes merely provides a convenient way in which to identify unaligned nodes and aligned nodes.

At step 332, the set of rules is applied to each of the unaligned nodes. FIG. 7 schematically illustrates aspects of step 332 that can be implemented to apply the set of rules. In one embodiment as discussed above, the rules are applied in a specified order. Herein "N" is a counter that is used to indicate which of the rules is applied. In the first iteration, step 334 applies the first rule to each of the unaligned nodes. If a rule fails to be applicable to any of the unaligned nodes, another rule from the set (and in one embodiment, the next successive rule indicative of a linguistically meaningful alignment) is then applied as indicated at steps 336 and 338.

If all the rules of the set of rules have been applied to all the nodes at step 340, the alignment procedure is finished. It should be noted that under some situations, not all of the nodes will be aligned.

If a rule can be applied to a set of nodes of the logical forms, the nodes are identified as being aligned and removed from the set of unaligned nodes, and application of the rules continues. However, in one embodiment, it is advantageous to begin again with the rules once some rules have been applied to obtain a more linguistically meaningful alignment. Therefore, it can be desirable to again apply rules that have previously been applied. In this manner, in one embodiment, each of the rules of the set of rules is applied again starting with, for example, the first rule as indicated at step 342.

The following is an exemplary set of rules for aligning nodes of the logical forms. The set of nodes presented herein is ordered based on the strongest to weakest linguistically meaningful alignments of the nodes. As appreciated by those skilled in the art, reordering of at least some of the rules presented herein may not significantly alter the quality of alignments of the logical forms.

1. If a bi-directionally unique translation exists between a node or set of nodes in one logical form and a node or set of nodes in the other logical form, the two nodes or sets of nodes are aligned to each other. A bi-directionally unique translation exists if a node or a set of nodes of one logical form has a tentative correspondence with a node or a set of nodes in the other logical form, such that every node in the first set of nodes has a tentative correspondence with every node in the second set of nodes, and no other correspondences, and every node in the second set of nodes has a tentative correspondence with every node in the first set of nodes, and no other correspondences.

2. A pair of parent nodes, one from each logical form, having a tentative correspondence to each other, are aligned with each other if each child node of each respective parent node is already aligned to a child of the other parent node.

3. A pair of child nodes, one from each logical form, are aligned with each other if a tentative correspondence exists between them and if a parent node of each respective child node is already aligned to a corresponding parent node of the other child.

4. A pair of nodes, one from each logical form, are aligned to each other if respective parent nodes of the nodes under consideration are aligned with each other and respective child nodes are also aligned with each other.

5. A node that is a verb and an associated child node that is not a verb from one logical form are aligned to a second node that is a verb of the other logical form if the associated child node is already aligned with the second verb node, and either the second verb node has no aligned parent nodes, or the first verb node and the second verb node have child nodes aligned with each other.

6. A pair of nodes, one from each logical form, comprising the same part-of-speech, are aligned to each other, if there are no unaligned sibling nodes, and respective parent nodes are aligned, and linguistic relationships between the set of nodes under consideration and their respective parent nodes are the same.

7. A pair of nodes, one from each logical form, comprising the same part-of-speech, are aligned to each other if respective child nodes are aligned with each other and the linguistic relationship between the set of nodes under consideration and their respective child nodes are the same.

8. If an unaligned node of one of the logical forms having immediate neighbor nodes comprising respective parent nodes, if any, all aligned, and respective child nodes, if any, all aligned, and if exactly one of the immediate nodes is a non-compound word aligned to a node of the other logical form comprising a compound word, then align the unaligned node with the node comprising the compound word. Note that the immediate neighbor nodes herein comprise adjacent parent and child nodes however the existence of parent and child nodes is not required, but if they are present, they must be aligned.

9. A pair of nodes, one from each logical form, comprising pronouns, are aligned to each other if respective parent nodes are aligned with each other and neither of the nodes under consideration have unaligned siblings.

10. A pair of nodes, one from each logical form, comprising nouns are aligned to each other if respective parent nodes comprising nouns are aligned with each other and neither of the nodes under consideration have unaligned sibling nodes, and wherein a linguistic relationship between each of the nodes under consideration and their respective parent nodes comprises either a modifier relationship or a prepositional relationship.

11. A first verb node of one logical form is aligned to a second verb node of the other logical form if the first verb node has no tentative correspondences and has a single associated child verb node that is already aligned with the second verb node.

12. A first verb node and a single, respective parent node of one logical form is aligned to a second verb node of the other logical form if the first verb node has no tentative correspondences and has a single parent verb node that is already aligned with the second verb node, where the single parent verb node has no unaligned verb child nodes besides the first verb node, and the second verb node has no unaligned verb child nodes.

13. A first node comprising a pronoun of one logical form is aligned to a second node of the other logical form if a parent node of the first node is aligned with the second node and the second node has no unaligned child nodes.

14. A first verb node and a respective parent verb of one logical form is aligned to a second verb node of the other logical form if the first verb node has no tentative correspondences and the parent verb node is aligned with the second verb node and where the relationship between the first verb and the parent verb node comprise a modal relationship.

Some general classifications of the rules provided above include that one rule (rule 1) is primarily based upon the correspondences established in step 302, and in the embodiment illustrated, it is considered to be the strongest meaningful alignment since no ambiguity is present. Other rules such as rules 2, 3, 11, 12 and 14 are based on a combination of, or a lack of, tentative correspondences and the structure of the nodes under consideration and previously aligned nodes. The remaining rules rely solely on relationships between nodes under consideration and previously aligned nodes. Other general classifications that can be drawn include that the rules pertain to verbs, nouns and pronouns.

Referring back to the logical forms and tentative correspondences of FIG. 5A, the rules set out above can be applied according to the method 300 of FIG. 4 in order to align the nodes as illustrated in FIG. 5B. In this example, the two instances of "Hipervinculo" have two ambiguous tentative correspondences, and while the correspondence from "Información" to "Hyperlink_Information" is unique, the reverse is not. It should also be noted that neither the monolingual nor the bilingual lexicons or dictionaries have been customized for this domain. For example, there is no entry in the lexicon for "Hyperlink_Information". This unit has been assembled by general rules that link sequences of capitalized words. Tentative lexical correspondences established for this element are based on translations found for its individual components.

Applying the alignment rules as described above, the alignment mappings created by the rules are illustrated in FIG. 5B as dotted lines 344, and are obtained as follows.

Iterating through the rules again, rule 1 applies in three places, creating alignment mappings between "dirección" and "address", "usted" and "you", and "clic" and "click". These are the initial "best" alignments that provide the anchors from which the method will work outwards to align the rest of the structure.

Rule 2 does not apply to any nodes, but Rule 3 applies next to align the instance of "hipervinculo", that is the child of "dirección" to "hyperlink", which is the child of "address". The alignment method thus leveraged a previously created alignment ("dirección" to "address") and the structure of the logical form to resolve the ambiguity present at the lexical level.

Rule 1 applies (where previously it did not) to create a many-to-one mapping between "Información" and "hiperv-inculo" to "Hyperlink_Information". The uniqueness condition in this rule is now met because the ambiguous alternative was cleared away by the prior application of Rule 3.

Rule 4 does not apply, but rule 5 applies to rollup "hacer" with its object "clic", since the latter is already aligned to a verb. This produces the many-to-one alignment of "hacer" and "clic" to "click"

Referring back to FIG. 7, alignment of the logical forms is completed when the rules are no longer applicable to any of the nodes. At this point, transfer mappings can be obtained by component 212.

FIG. 8 illustrates some of the transfer mappings obtainable from the example of aligned logical forms in FIG. 5B (other than transfer mapping 353 which is included as an example of a conflicting transfer mapping discussed in the next section). Generally, a transfer mapping or simply "mapping" is indicative of associating a word or logical form of a first language with a corresponding word or logical form of a second language. The mappings can be stored on any computer readable medium as explicit pointers linking the words or logical forms of the first language with the corresponding words or logical forms of the second language. Likewise, the mappings can be stored with the words or logical forms rather than in a separate database. As appreciated by those skilled in the art, other techniques can be used to associate words or logical forms of the first language with words or logical forms of the second language, and it is this association, that constitutes the mappings regardless of the specific techniques used in order to record this information.

Each mapping created during the alignment procedure can be a base structure upon which further mappings with additional context are also created. In particular, information can be stored on a computer readable medium to translate text from a first language to a second language, where the information comprises a plurality of mappings. Each mapping is indicative of associating a word or logical form of the first language with a word or logical form of the second language. However, in addition, at least some of the mappings corresponding to logical forms of the first language have varying context with some common elements. Likewise, at least some of the logical forms of the second language corresponding to the logical forms of the first language may also have varying context with some common elements. In other words, at least some of the core mappings obtained from the alignment procedure are used to create other, competing mappings having varying types and amounts of local context.

Referring to FIG. 8, mappings 350, 352, and 354 illustrate how an element of a logical form can vary. Mapping 350 comprises the base or core mapping on which further mappings are created. Mapping 352 expands the core mapping 350 to include an additional linguistic element, herein the direct object of the word "click", while the mapping 354 is expanded from the core mapping 350 such that the additional element comprises an under-specified node ("*") indicating a part of speech but no specific lemma. By comparing the mappings 350, 352 and 354, as well as mappings 356 and 358, it can be seen that the logical forms of the first language have common elements (parts of speech and/or lemmas), while the logical forms of the second language also have common elements.

By storing mappings indicative of logical forms with overlapping context, during translation run time, fluency and general applicability of the mappings for translating between the languages is maintained. In particular, by having mappings associating both words and smaller logical forms of the languages, translation from the first language to the second language is possible if the text to be translated was not seen in the training data. However, to the extent that the larger context was present in the training data, this is also reflected in the mappings such that when a mapping of larger context is applicable, a more fluent translation between the first language and the second language can be obtained.

Generally, linguistic constructs are used to provide boundaries for expanding the core mappings to include additional context. For example, a mapping for an adjective can be expanded to include the noun it modifies. Likewise, a mapping for a verb can be expanded to include the object as context. In another example, mappings for noun collocations are provided individually as well as a whole. As further illustrated in FIG. 8, some of the mappings can include under-specified nodes ("*"), wherein the part of speech is indicated but no specific lemma is provided. These types of mappings increase the overall applicability of the mappings for translating from the first language to the second language, but also include context to enhance fluency of the translation obtained.

In general, mappings that can be created may have any number of wild-card or underspecified nodes, which may be underspecified in a number of different ways. For example, they may or may not specify a part-of-speech, and they may specify certain syntactic or semantic features. For example, a pattern may have a wild-card node with the feature "ProperName" or "Location" marked, indicating that the pattern only applies when that node is matched to an input node that has the same feature. These wild-cards allow the system to hypothesize generalized mappings from specific data.

Matching the Transfer Mappings During Run Time

In addition to the information pertaining to the mappings between the words or logical forms of the first language and the second language, additional information can also be stored or used during run time translation. The additional information can be used to choose an appropriate set of mappings and resolve conflicts as to which mappings to use, i.e. (referring to FIG. 2) when a source logical form 252 (or part thereof) generated for a source sentence 250 matches more than one source side of the transfer mappings in the transfer mapping database 218.

For example, when the source logical form matches the source side of multiple transfer mappings in database 218, a subset of these matching transfer mappings is illustratively selected such that all transfer mappings in the subset are compatible with one another (i.e., they are not conflicting) and based on a metric that is a function of how much of the input sentence the transfer mappings in the subset collectively cover, as well as other measures related to individual transfer mappings. Some such measures are set out in Table 1.

TABLE 1

| | |
|---|---|
| 1. | Size of transfer mapping matched. |
| 2. | The frequency with which the transfer mapping was seen in the training data. |
| 3. | The frequency with which the transfer mapping was generated from fully aligned logical forms. |
| 4. | The frequency with which the transfer mapping was generated from partially aligned logical forms. |

TABLE 1-continued

| | |
|---|---|
| 5. | The frequency with which the transfer mapping was generated from logical forms that resulted from a fitted parse. |
| 6. | An alignment score assigned to the transfer mapping by the alignment component. |

Once the subset of matching transfer mappings is selected, the transfer mappings in the subset are combined into a transfer logical form from which the output text is generated.

It should be noted that the subset of matching transfer mappings can contain overlapping transfer mappings, so long as they are compatible. For example, the following logical form can be generated for the Spanish sentence "Haga clic en el direccion de la oficina" which can be translated as "Click the office address":

Hacer -- Dobj - click
   - en - direccion
      - de - oficina

This logical form can potentially be matched to all of the transfer mappings 350, 352 and 354 because each transfer mapping contains this logical form. These transfer mappings overlap, but do not conflict (because all can be translated as the same thing). Therefore, all may be included in the subset of matching transfer mappings, and the transfer logical form can be generated from them. However, if it is desired to choose among them, the best choice may be transfer mapping 352 because it is the largest. Others could be chosen for a variety of other reasons as well.

An example of conflicting, matching transfer mappings is shown as transfer mapping 353, which conflicts with transfer mapping 352. Therefore, for example, the logical form:

Hacer -- Dobj - click
   - en - direccion would match all of transfer mappings 350, 352, 353 and 354. However, since transfer mappings 352 and 353 conflict (because they are translated differently) both cannot be part of the selected subset of matching transfer mappings. Thus, one is selected based on a predetermined metric. For example, subset 350, 352 and 354 can be compared against subset 350, 353 and 354 to see which covers the most nodes in the input logical form, collectively. Also, both transfer mappings 352 and 353 are the same size (on the source side). Therefore, other information can be used to distinguish between them in selecting the subset of matching transfer mappings.

As another example of conflicting transfer mappings, assume that a number of sentences processed during training included the phrase "click <something>" that aligned to the Spanish "hacer clic en <something>". In other sentences, assume the sentence "click <something>" aligned to "elegir <something>" (literally "select something").

This yields the following mappings (note these examples are English mapped to Spanish whereas previous examples have been Spanish mapped to English):

Click                        hacer
  Tobj -- *   ⟶   Tobj -- clic
                                en -- * for the first case, and

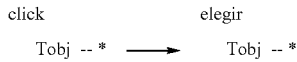

in the second case.

In the proper contexts, translating "click" to "select" may be a legitimate variation. However it does present a problem in some cases. For example, notice that the source side of both transfers is identical, so at runtime, if the input logical form matches that source side, we are left with having to choose between the two different target sides, i.e. it must be decided whether to translate the input as "hacer clic . . . " or as "elegir . . . "? In the absence of further context (which would likely have manifested itself by causing differing source sides of the transfers) we choose between them based on various frequency and scoring metrics.

Another type of conflict should also be mentioned. At runtime, for a given input sentence, there may be multiple matching transfer mappings that match different parts of the input sentence. Several of them can be chosen as the selected subset so that they can be stitched together to produce a transfer LF that covers the entire input. However, some of these matches that are stitched together will overlap one another, and some will not. Of the ones that overlap, we can only use those that are "compatible" with one another. As discussed above, by "overlap" we mean two mappings where at least one node of the input sentence is matched by both mappings. By compatible, we mean the following: matches are always compatible if they do not overlap, and matches that do overlap are compatible if the target sides that correspond to the node(s) at which they overlap are identical.

For example, if an input sentence is "cambiar configuracion de seguridad" (translated as "change the security setting") and it matches a transfer mapping as follows:

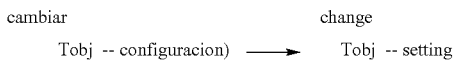

and we match another mapping of:

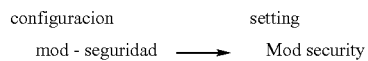

then the two matches do overlap (on "configuracion"), but they are compatible, because they also both translate "configuracion" to "setting". Therefore, we can combine them to produce a transfer LF (or target LF)of:
 change
  Tobj setting
   Mod security
However suppose there was also a third mapping of:

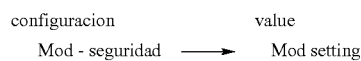

then this mapping which does overlap the previous two at "configuracion", is not compatible, because it would translate "configuracion" to "value", not "setting". Therefore, this mapping cannot be merged with the previous two, so either this transfer mapping, or the previous two, must be chosen, but not both at the same time.

Table 1 shows examples of the information that can be used to further define the subset of matching transfer mappings (either to choose among conflicting matching transfer mappings or to narrow the subset of compatible, matching transfer mappings). Such information can include how much of the input sentence is covered by the subset of matching transfer mappings (collectively) and the size of the mappings, which can be ascertained from the logical form that is matched in the transfer mapping itself. The size of a logical form includes both the number of specified nodes as well as the number of linguistic relationships between the nodes. Thus, by way of example, the size of the logical form from the source side of mapping 350 equals 2, while the size of the logical form on the target side equals 1. In another example, the logical form on the source side of mapping 354 equals 4, while the target side of mapping 354 equals 2.

The information for choosing the subset of transfer mappings can also include other information related to individual transfer mappings, such as the frequency with which the logical forms in the transfer mapping are seen in the training data. If desired, the training data can include "trusted" training data, which can be considered more reliable than other training data. The frequency of the mapping as seen in the trusted training data can be retained in addition, or in the alternative, to storing the frequency of the mapping as seen in all of the training data.

Other information that can be helpful in selecting the subset of matching transfer mappings when matching source logical forms to transfer mappings includes the extent of complete alignment of the logical forms in the training data from which the logical forms of a transfer mapping have been obtained. In other words, the alignment procedure can fully or completely align the nodes of the larger logical forms, or some nodes can remain unaligned. In the example of FIG. 5B, all the nodes were aligned; however, as indicated above, this may not always be the case. Those mappings associated with fully aligned logical forms may be considered more reliable. Of course, information for resolving conflicts or further defining the subset can also indicate the frequency with which the mapping was generated from both fully aligned logical forms as well as partially aligned logical forms.

Likewise, additional information can include the frequency with which the logical forms in the transfer mapping originated from a complete parse of the corresponding training data. In particular, the frequency with which the mapping originated from a complete or fitted parse, or in contrast, the frequency that the mapping originated from only a partial parse can be stored for later use in resolving conflicts while matching during translation.

Another form of information can include a score or value assigned to the transfer mapping by the alignment procedure used to extract the mapping. For instance, the score can be a function of how "strong" (linguistically meaningful) the aligned nodes are (or how confident the alignment component is in the transfer mapping). The score can therefore be a function of when (which iteration) and which rule formed the alignment. The particular function or metric used to calculate the alignment score is not crucial, and any such metric can be used to generate information related to an alignment score that can be used during run time translation.

It should be noted that, although the present invention is described above primarily with respect to analyzing, aligning and using logical forms, at least some of the inventive concepts discussed herein are applicable to other dependency structures as well.

Although the present invention has been described with reference to particular embodiments, workers skilled in the art will recognize that changes may be made in form and detail without departing from the spirit and scope of the invention.

What is claimed is:

1. A computer implemented method of translating a textual input in a first language to a textual output in a second language, comprising:
    generating an input logical form based on the textual input;
    selecting a set of one or more of a plurality of matching transfer mappings in a transfer mapping database that match at least a portion of the input logical form, based on a predetermined metric;
    combining the set of transfer mappings into a target logical form; and
    generating the textual output based on the target logical form.

2. The method of claim 1 wherein the input logical form includes a plurality of input nodes and wherein selecting comprises:
    selecting the set of transfer mappings based on a number of input nodes covered by the set of transfer mappings, collectively.

3. The method of claim 1 wherein selecting comprises:
    selecting the set of transfer mappings based on sizes of the plurality of matching transfer mappings.

4. The method of claim 3 wherein selecting comprises:
    selecting the set of transfer mappings as a largest of the plurality of matching transfer mappings.

5. The method of claim 1 wherein selecting comprises:
    selecting the set of transfer mappings based on frequencies with which the plurality of matching transfer mappings were generated during a training phase used in training the transfer mapping database.

6. The method of claim 1 wherein selecting comprises:
    selecting the set of transfer mappings based on frequencies with which the plurality of matching transfer mappings were generated from completely aligned logical forms during a training phase used in training the transfer mapping database.

7. The method of claim 1 wherein selecting comprises:
    selecting the set of transfer mappings based on frequencies with which the plurality of matching transfer mappings were generated from partially aligned logical forms during a training phase used in training the transfer mapping database.

8. The method of claim 1 wherein selecting comprises:
    selecting the set of transfer mappings based on frequencies with which the plurality of matching transfer mappings were generated from non-fitted parses of training data used to generate logical forms during a training phase used in training the transfer mapping database.

9. The method of claim 1 wherein selecting comprises:
    selecting the set of transfer mappings based on a score associated with each of the plurality of matching transfer mappings, the score being indicative of a confidence in the transfer mapping with which it is associated.

10. The method of claim 1 wherein combining the set of transfer mappings comprises:
    generating a linked logical form, indicative of links between the input logical form and logical forms in the transfer mapping database, based on the set of transfer mappings.

11. The method of claim 10 wherein combining further comprises:
    generating a target logical form based on the linked logical form.

12. The method of claim 11 wherein generating the target logical form comprises:
    accessing a bilingual dictionary based on words in the linked logical form.

13. The method of claim 11 wherein generating the textual output comprises:
    generating the textual output based on the target logical form.

14. The method of claim 1 wherein selecting comprises:
    selecting as the set a plurality of overlapping, matching transfer mappings.

15. The method of claim 14 wherein combining comprises:
    combining the plurality of overlapping, matching transfer mappings to obtain the target logical form.

16. A machine translation system for translating a textual input in a first language to a textual output in a second language, the machine translation system comprising:
    a transfer mapping data store including a plurality of transfer mappings having a logical form in the first language mapped to a logical form in the second language;
    a matching component configured to match input logical forms generated based on the textual input in the first language to a set of one or more of a plurality of matching transfer mappings in the transfer mapping database, wherein the logical form in the first language of a matching transfer mapping matches at least a portion of the input logical form, based on a predetermined metric; and
    a generation component configured to generate the textual output based on the logical forms in the second language in the selected transfer mappings.

17. The machine translation system of claim 16 and further comprising:
    a logical form generator receiving the textual input and generating the input logical forms based on the textual input.

18. A machine translation system for translating a textual input in a first language to a textual output in a second language, the machine translation system comprising:
    an input generator generating an input dependency structure based on the textual input;
    a transfer mapping database including a plurality of transfer mapping dependency structures formed based on at least ten thousand parallel, aligned, training sentences;
    a matching component configured to receive the input dependency structure and match it against a matching set of one or more of the transfer mapping dependency structures in the transfer mapping database; and
    a generation component configured to generate the textual output based on the matching transfer mapping dependency structure.

19. The machine translation system of claim 18 wherein the transfer mapping database includes a plurality of transfer mapping dependency structures formed based on at least fifty thousand parallel, aligned, training sentences.

20. The machine translation system of claim 19 wherein the transfer mapping database includes a plurality of transfer mapping dependency structures formed based on at least one hundred thousand parallel, aligned, training sentences.

21. The machine translation system of claim 19 wherein the transfer mapping database includes a plurality of transfer mapping dependency structures formed based on at least one hundred eighty thousand parallel, aligned, training sentences.

22. The machine translation system of claim 19 wherein the transfer mapping database includes a plurality of transfer mapping dependency structures formed based on at least two hundred thousand parallel, aligned, training sentences.

23. A computer implemented method of training a transfer mapping database, comprising:
   receiving a plurality of parallel, aligned, pairs of input sentences in two different languages;
   generating input logical forms for the input sentences in both languages, the input logical forms being shared across both languages; and
   training the transfer mapping database based on the input logical forms.

24. The method of claim 23 wherein training comprises:
   aligning the input logical forms to obtain transfer mappings; and
   training the transfer mapping database based on the transfer mappings.

25. The method of claim 24 wherein training the transfer mapping database based on transfer mappings comprises:
   training the transfer mapping database based only on transfer mappings obtained from the aligned logical forms at least a predetermined threshold number of times.

26. The method of claim 25 wherein the predetermined threshold number of times comprises two times.

27. The method of claim 23 wherein receiving comprises receiving at least ten thousand parallel, aligned, training sentences.

28. The method of claim 23 wherein receiving comprises receiving at least fifty thousand parallel, aligned, training sentences.

29. The method of claim 23 wherein receiving comprises receiving at least one hundred thousand parallel, aligned, training sentences.

30. The method of claim 23 wherein receiving comprises receiving at least one hundred eighty thousand parallel, aligned, training sentences.

31. The method of claim 23 wherein receiving comprises receiving at least two hundred thousand parallel, aligned, training sentences.

32. A computer implemented method of training a transfer mapping database, comprising:
   receiving a plurality of parallel, aligned, pairs of input sentences in two different languages;
   generating input logical forms for the input sentences in both languages;
   aligning the input logical forms to obtain transfer mappings;
   filtering the transfer mappings obtained; and
   training the transfer mapping database based only on the filtered transfer mappings.

33. The method of claim 32 wherein filtering the transfer mappings comprises:
   filtering transfer mappings obtained from the aligned logical forms less than at least a predetermined threshold number of times.

34. The method of claim 33 wherein filtering the transfer mappings comprises:
   filtering transfer mappings obtained from the aligned logical forms less than at least two times.

* * * * *